(12) United States Patent
Lingen et al.

(10) Patent No.: US 11,266,928 B2
(45) Date of Patent: Mar. 8, 2022

(54) FILTER DEVICE

(71) Applicant: HYDAC PROCESS TECHNOLOGY GMBH, Neunkirchen (DE)

(72) Inventors: Hans-Juergen Lingen, Moenchengladbach (DE); Stefan Klein, Bad Muenstereifel (DE); Raphael Klein, Frechen (DE); Markus Breinig, Frechen (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 252 days.

(21) Appl. No.: 16/339,041

(22) PCT Filed: Oct. 9, 2017

(86) PCT No.: PCT/EP2017/001192
§ 371 (c)(1),
(2) Date: Apr. 3, 2019

(87) PCT Pub. No.: WO2018/068888
PCT Pub. Date: Apr. 19, 2018

(65) Prior Publication Data
US 2019/0240600 A1 Aug. 8, 2019

(30) Foreign Application Priority Data

Oct. 12, 2016 (DE) .................... 10 2016 012 206.4
Mar. 1, 2017 (DE) .................... 10 2017 001 968.1
Mar. 1, 2017 (DE) .................... 10 2017 001 970.3

(51) Int. Cl.
*B01D 29/54* (2006.01)
*B01D 29/23* (2006.01)
(Continued)

(52) U.S. Cl.
CPC ........... *B01D 29/232* (2013.01); *B01D 29/23* (2013.01); *B01D 29/54* (2013.01); *B01D 29/58* (2013.01);
(Continued)

(58) Field of Classification Search
CPC ...... B01D 29/232; B01D 29/23; B01D 29/54; B01D 29/58; B01D 29/682; B01D 29/688;
(Continued)

(56) References Cited

U.S. PATENT DOCUMENTS 3,017,029 A * 1/1962 Berninger ............ B01D 29/684
210/108
3,357,566 A * 12/1967 Schmid .................. B01D 29/54
210/333.01
(Continued)

FOREIGN PATENT DOCUMENTS

DE          84 38 010      4/1986
DE     10 2007 014 573      9/2008
(Continued)

OTHER PUBLICATIONS

International Search Report (ISR) dated Jan. 30, 2018 in International (PCT) Application No. PCT/EP2017/001192.

*Primary Examiner* — Chester T Barry
(74) *Attorney, Agent, or Firm* — Wenderoth, Lind & Ponack, L.L.P.

(57) ABSTRACT

A filter device, in particular for lubricating oil filtration, includes at least two filter inserts (27), in each of which a filter material (43) is accommodated. The filter inserts are provided with fluid passage points (37, 39) and can be stacked on top of one another with the formation of a stack. A back-flushing device (55,57) is movably arranged along the inner side of the filter inserts (27). The individual filter (Continued)

inserts (27) are designed as identical parts at least with respect to their housings.

15 Claims, 6 Drawing Sheets

(51) Int. Cl.
- *B01D 29/68* (2006.01)
- *B01D 29/58* (2006.01)
- *B01D 29/94* (2006.01)
- *B01D 35/00* (2006.01)
- *B01D 35/147* (2006.01)

(52) U.S. Cl.
CPC ......... *B01D 29/682* (2013.01); *B01D 29/688* (2013.01); *B01D 29/94* (2013.01); *B01D 35/005* (2013.01); *B01D 35/147* (2013.01); *B01D 2201/082* (2013.01)

(58) Field of Classification Search
CPC .... B01D 29/94; B01D 35/005; B01D 35/147; B01D 29/00
See application file for complete search history.

(56) References Cited

U.S. PATENT DOCUMENTS

| | | | |
|---|---|---|---|
| 5,141,637 A | | 8/1992 | Reed et al. |
| 5,557,163 A | * | 9/1996 | Wakalopulos ......... H01J 33/04 313/420 |
| 2002/0079292 A1 | * | 6/2002 | Wehrli .................. B23Q 39/02 219/69.11 |
| 2005/0252838 A1 | | 11/2005 | Fisher |
| 2009/0261029 A1 | | 10/2009 | Fisher |
| 2010/0193426 A1 | | 8/2010 | Kubler et al. |
| 2011/0146919 A1 | * | 6/2011 | Smith ...................... E06B 9/26 160/115 |
| 2013/0200006 A1 | * | 8/2013 | Hampton ........... B01D 29/6453 210/744 |
| 2014/0277494 A1 | * | 9/2014 | Muhanna M.D. .... A61F 2/4455 623/17.16 |
| 2014/0298763 A1 | * | 10/2014 | Blossey ............. B01D 46/0024 55/498 |
| 2015/0283486 A1 | | 10/2015 | Fisher |
| 2016/0030888 A1 | * | 2/2016 | Diemer ................ B01D 63/081 210/321.84 |
| 2016/0097247 A1 | * | 4/2016 | Marco ................. B01D 29/688 166/308.1 |
| 2017/0065912 A1 | | 3/2017 | Hampton et al. |

FOREIGN PATENT DOCUMENTS

| | | |
|---|---|---|
| DE | 20 2011 000 268 | 7/2012 |
| DE | 10 2011 086 670 | 5/2013 |
| DE | 20 2012 104 534 | 4/2014 |
| DE | 20 2016 003 089 | 7/2016 |
| EP | 0 487 831 | 6/1992 |
| EP | 1 598 101 | 11/2005 |
| WO | 00/78426 | 12/2000 |
| WO | WO-2004007251 A1 * 1/2004 ......... B60R 22/3413 |

* cited by examiner

FILTER DEVICE

FIELD OF THE INVENTION

The invention relates to a filter device, in particular for the filtration of lubricating oil, having at least two filter inserts, in each of which a filter material is disposed. The filter inserts are provided with fluid passage points and can be stacked on top of one another, thereby forming a stacked structure. A backwash device, which is displaceably arranged along the inside of the filter inserts, is in the filter device.

BACKGROUND OF THE INVENTION

The integrity of lubricating oil is very important for the operational reliability and durability of internal combustion engines. In particular the continuous operation of diesel engines, which are operated using heavy oil, for instance in marine applications, puts particularly high demands on the condition of the lubricating oil. In such applications, the use of filter devices for the purification of lubricating oil is essential. In this regard the prior art specifies that filter devices are used in which the filter inserts can be back-washed in order to permit longer time periods between the replacement of filter inserts, to keep maintenance costs low. Document DE 20 2016 003 089 U shows a filter device of the type described above as an example of the corresponding prior art.

SUMMARY OF THE INVENTION

Based on this prior art, the invention addresses the problem of providing a filter device of the type mentioned above, which can be produced in a particularly simple and cost-effective manner.

According to the invention, this problem is basically solved by a filter device having, as an essential feature of the invention, individual filter inserts formed as identical parts at least with respect to their housings. By injection molding, in particular from plastic materials, it is possible to produce identical parts in an economical manner at low production costs due to the elimination of the cost for different molding tools. This results in low acquisition costs for the filter device and low maintenance costs associated with filter replacement, and thus, low total operating costs. Cost-effective plastic materials such as polyamides, for example PA6, can be used as housing materials, optionally with an oil-proof coating.

In advantageous exemplary embodiments, the housing of the filter inserts has an annular body at each of its free face sides.

At least one projecting annular rib can advantageously be provided on the annular body on the one free face side of a filter insert. The annular rib engages with an associated annular recess in the annular body on the other face side of a downstream filter insert, thereby forming the stacked structure. The stacked structure can then be formed at low assembly costs as an integral component made of filter inserts because the engagement of the relevant annular rib with the corresponding recess ensures the reciprocal centering of the filter inserts without special measures. Furthermore, the filter inserts can be connected to one another in a simple manner by gluing. The adhesive is introduced into the relevant recess before the filter elements are assembled, for example, in the form of a two-component glue.

In advantageous exemplary embodiments, the relevant annular rib is subdivided into rib parts by at least one interruption forming a gap. At least one projection engages with a gap of the annular rib provided in the downstream filter insert in the stacked structure in the annular recess. In addition to the reciprocal centering, a form-fitting anti-twist protection is then also formed between the filter inserts. The arrangement can in particular be such that the one free face side of each filter insert has the relevant annular rib with the at least one intermediate gap, and correspondingly the other free face side has the respective annular recess with the projection located therein.

In particularly advantageous exemplary embodiments, the face sides of the filter inserts facing away from one another arranged in the stacked structure each have a cover part, which are designed as identical parts. These too can be manufactured from the above-mentioned plastic material by injection molding in an economical manner. Due to their design as identical parts, they can be produced at low molding tool costs.

At least one part of the cover parts is advantageously fluid-permeable, such that the flow path to the inside of the filter inserts is kept free for the filtering.

In particularly advantageous exemplary embodiments, the arrangement is such that the annular body of the housings of the filter inserts, one of which has the annular recess and the other of which has the rib part, are connected to one another via inner and outer longitudinally extending frame parts. The frame parts delimit window-shaped fluid passage points. A filter medium is accommodated in the space between inner and outer frame parts. The filter medium is preferably a single- or multi-layer, pleated filter mat track having a metallic supporting mesh on the outside on both sides. The fluid passage points are used to pass the filter medium preferably from the inside to the outside during filtration.

For every filter insert, the backwash device has a motor-drivable backwasher arm formed in the manner of a slot nozzle. Each slot nozzle travels along the fluid passage points formed on the inner frame parts by a drive shaft, serving to remove backwash from the device. Ambient pressure may be present at the hollow shaft, for the operational system pressure of the filter device to generate the volume flow of the backwash volume. Alternatively, a vacuum may be present in the hollow shaft due to a connected suction device.

In particularly advantageous exemplary embodiments, the individual slot nozzles of the backwasher arm are axially offset relative to one another and by a rotation angle such that at least one slot nozzle is located over or against a window-shaped fluid passage point and at least one additional, preferably adjacent slot nozzle is simultaneously disposed over or against a frame part next to another passage point. In this arrangement, the unblocking of a relevant passage window by a washer arm is linked to the blocking of another passage window by the other washer arm and vice versa. In this way the formation of pulsations in the backwash volume is minimized.

The adjacent inner longitudinal frame parts can be slanted relative to the radial direction, so that they define a flow direction for every passage window of each filter insert, which is slanted by a specified angle relative to the inflow direction of the opening of the relevant slot nozzle. This slanting results in a slanted flow path through the filter medium furthering the removal of contamination.

The arrangement can furthermore advantageously be such that the relevant slot nozzle expands starting from the inner side of the filter insert assignable thereto towards the hollow drive shaft. The flow cross section at the slot nozzle itself, tapered in comparison, produces a Venturi effect with locally increased flow speed in the effective area of the washer arm. This arrangement results in an increased backwash effect with a reduced washing volume.

In particularly advantageous exemplary embodiments, the backwasher arm for each filter insert has identical components, which are connected to each other by a tongue and groove connection at their face side, comparable to that of the filter inserts. The design with identical parts makes for reduced production costs for the entire device.

As an additional filter insert in the layer structure, one having at least one spring-loaded bypass valve can be used, to prevent the risk of interruption of the lubricating oil supply in the case of blocked filter inserts.

In exemplary embodiments, at least all filter inserts are glued to one another on their face sides adjacent to each other, thereby forming the layer structure, and are then connected to one another in an undetachable manner. The layer structure can be inserted and exchanged as a total package. The layer structure with the filter inserts can be removably installed in a filter housing, which has a fluid inlet for unfiltered fluid, a fluid outlet for filtered fluid and an outlet for the backwash.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
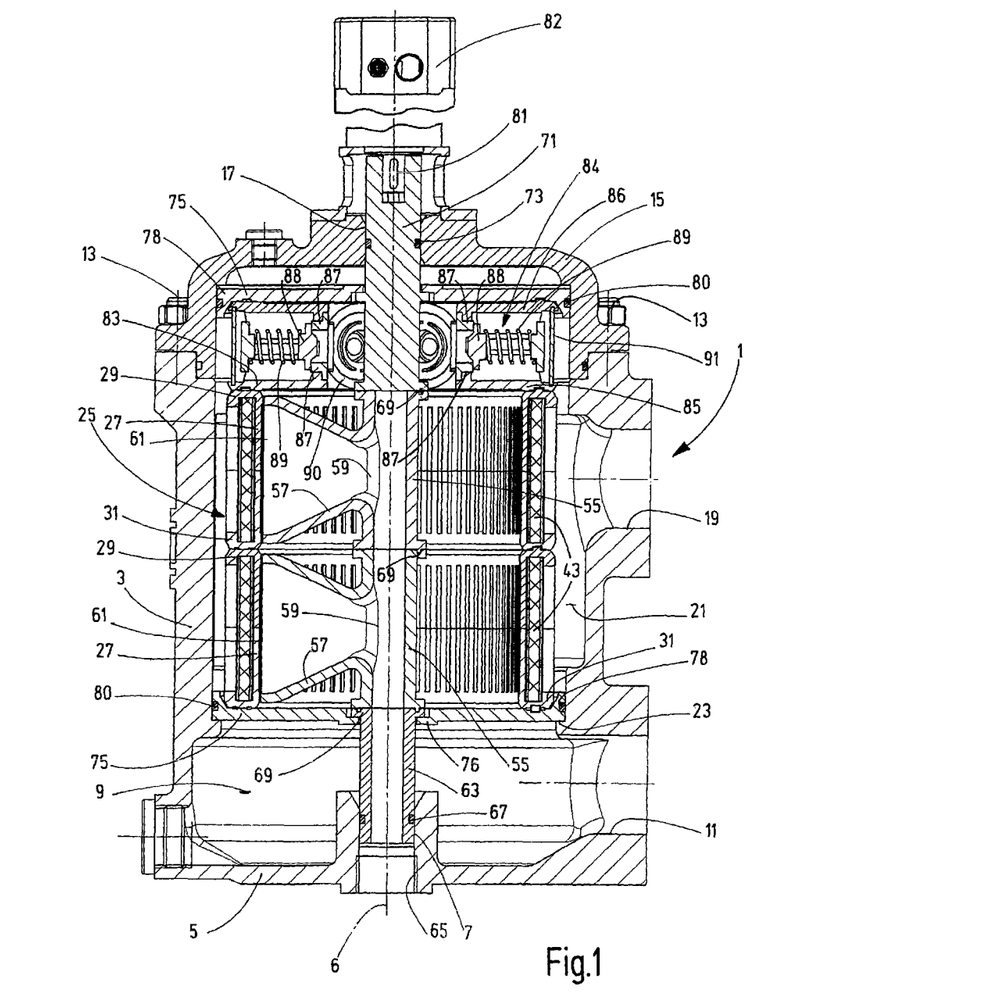
FIG. 1 is a side view in section of a filter device according to a first exemplary embodiment of the invention.

FIG. 1 shows an exemplary embodiment of the filter device according to the invention having a filter housing 1, which has a cup-shaped main housing part 3. At the base 5 of housing 1, a bearing point 7 is located coaxial to a central housing longitudinal axis 6. By way of access to the housing chamber 9, adjacent to the base 5 a side inlet 11 for the supply of unfiltered fluid is provided. The housing chamber 9 forms the dirty side. At the top, the main housing part 3 is closed by a housing cover 15 mounted in a removable manner by retaining screws 13, in which housing cover a bearing point 17 coaxial to the axis 6 is formed, just like in the base 5. In the main housing part 3, a filtered fluid outlet 19 is provided in the region of the housing cover 15. The filtered fluid outlet is arranged in a position aligned with the inlet 11 and outflows the filtered fluid from the adjacent housing chamber 21, which forms the clean side during operation. In the main housing part 3, above a wall shoulder 23 forming a step, which is located in the vicinity of the unfiltered fluid inlet 11, a backwash filter assembly 25 is arranged, which is depicted separated in FIG. 2.

Figure 3:
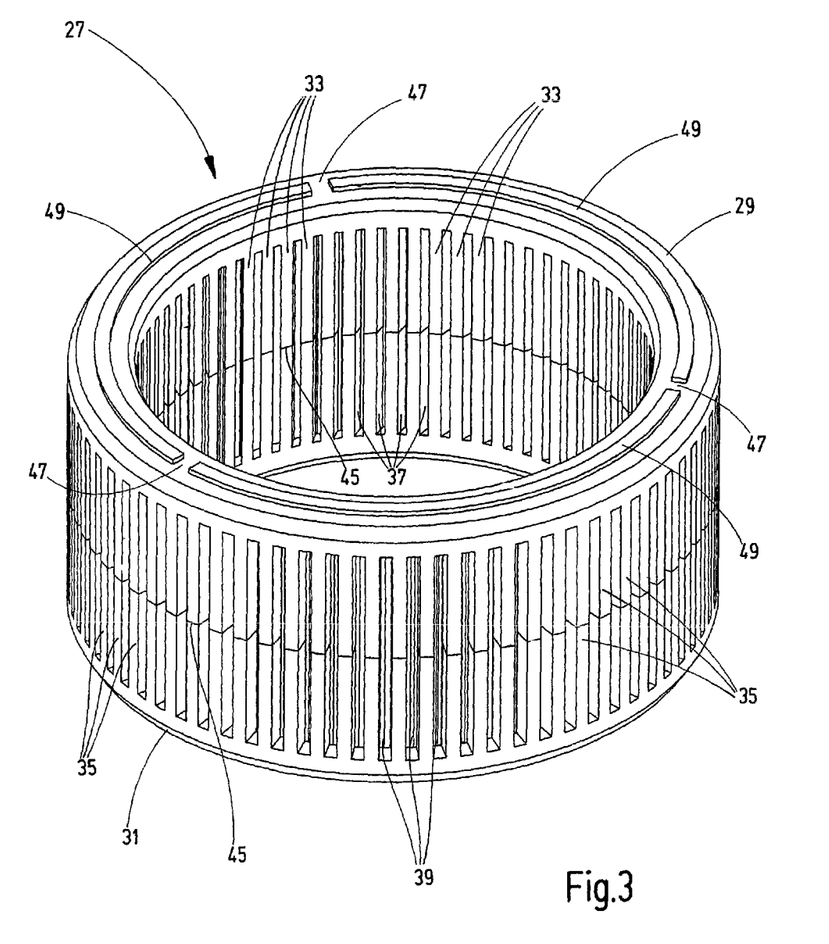
FIG. 3 is a perspective view of a separately depicted filter insert of the filter device of FIG. 1, viewed from the top.
Figure 4:
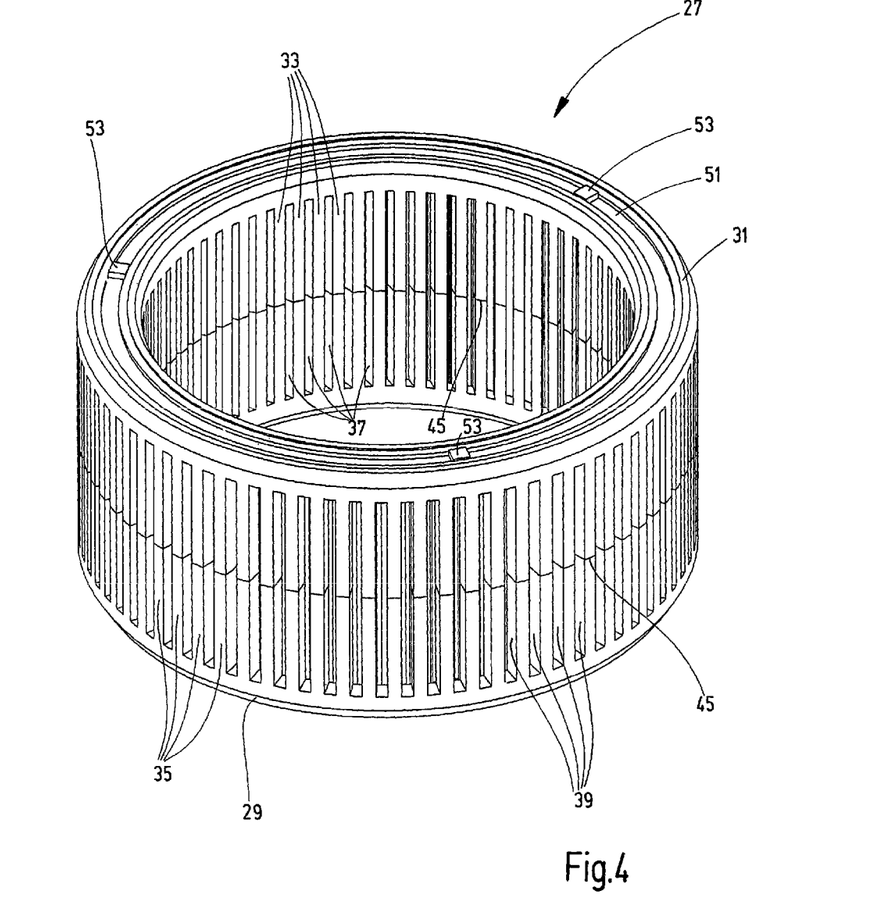
FIG. 4 is a perspective view of the filter insert of FIG. 3, viewed from the bottom.

The assembly 25 has a stacked structure of filter inserts. Two filter inserts 27 are provided in the depicted exemplary embodiment, which filter inserts are formed as identical parts and which are shown in FIGS. 3 and 4 in individual depictions. The circular cylindrical housing of the filter inserts 27 has, at every free face side, a first annular body 29 and a second annular body 31. The first annular body 29 can be seen at the top in FIG. 3. The second annular body 31 can be seen at the top in FIG. 4. A ring of inner frame parts 33 and a ring of outer frame parts 35 extend between the annular bodies 29, 31, which, for the sake of clarity, are not all numbered in the figures. The frame parts 33 and 35 extend at regular distances from one another parallel to the axis 6 of the circular cylindrical housing and leave open inner fluid passage points 37 and outer fluid passage points 39 between them. Passage points 37, 39 each extend in a continuous manner, slot-shaped between the frame parts 33, 35. The filter medium 43 is located in the chamber 41, FIGS. 5 and 6. The filter medium is a pleated filter mat track made up of at least one filter layer, on the two outer sides of which there is a supporting layer in the form of a mesh structure. In advantageous examples, the filter fineness is in the range from 25 to 34 µm. The outer and inner frame parts 33 and 35 extend away from the annular bodies 29, 31 each across half the axial length of the housing. During its assembly, the filter medium 43 is inserted into the chamber 41 of a housing half, whereupon the housing halves are pieced together and the frame parts 33 and 35 are butt joined to one another at the relevant joint 45 by welding or gluing.

The filter inserts 27 have, as FIGS. 3 and 4 most clearly show, an annular rib on the face side of the first annular body 29 concentric to the cylinder axis and axially projecting and having a rectangular cross section. The annular rib is subdivided by three interruptions, each of which forms a gap 47 of equal length, into three annular or arcuate rib parts 49 of equal length. On the opposite face side in the second annular body 31, which is visible at the top in FIG. 4, a recess 51 is formed, complementing the annular rib parts 49 and having the form of a sunk annular groove. Corresponding to the gaps 47 located between the annular rib parts 49 of the other annular body 29, projections 53 are formed in recess 51. When the filter inserts 27 are pieced together to form a stacked structure, this structure produces a form-fitting, corresponding engagement of the annular rib parts 49 with the recess 51 of the annular body 31, with simultaneous engagement of the projections 53 in the gaps 47 on the annular body 29. The filter inserts 27 are thus not only centered relative to one another, but are also secured against twisting or rotation relative to one another. The filter inserts 27 can be easily connected to one another to form a non-detachable structure, in that before the assembly a glue, preferably a two-component glue, is introduced into the recess 51.

Figure 2:
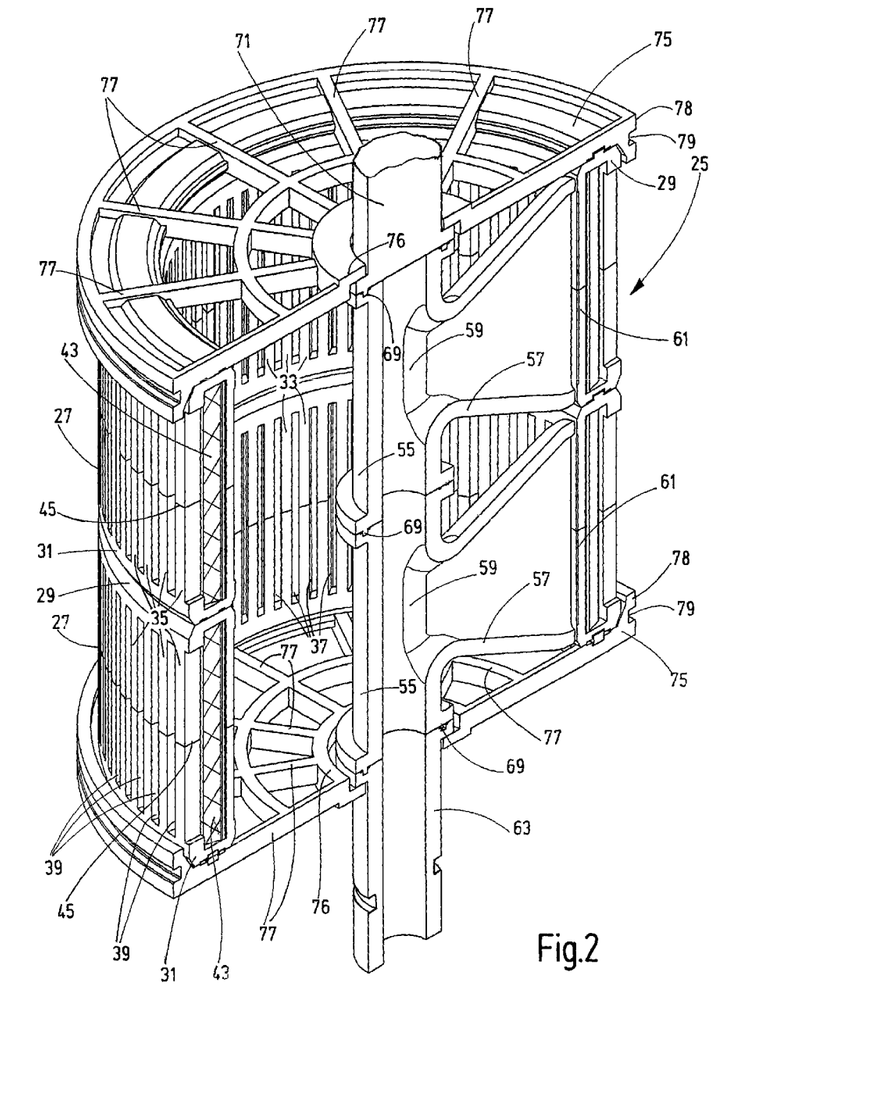
FIG. 2 is a perspective view in section of the backwash filter assembly of the exemplary embodiment of FIG. 1, depicted on a larger scale compared to FIG. 1 and taken along a centrally located central plane.

FIG. 2 shows the backwash filter assembly 25 formed of a stacked structure having two filter inserts 27. As depicted, each filter insert 27 has an inner backwash device or backwasher, having a coaxial hollow shaft 55, on which a washer arm 57 is located. The washer arms 57 radially extend from the hollow shaft 55 to the immediate vicinity of the inner circumference of the inner frame parts 33, FIGS. 5 and 6, and form, starting from an inflow point 59 on the hollow shaft 55, a narrow fluid path, which ends in a slot nozzle 61, cf. FIGS. 5 and 6. The slot nozzles 61 extend across the entire axial length of the inner fluid passage points 37. A hollow shaft end part 63 adjoins the hollow shaft 55 of the bottom washer arm 57, which hollow shaft end part is routed to the backwash outlet 65 on the base 5 of the filter housing 1. At base 5, the hollow shaft end part 63 is, in the case of an assembly 25 installed in the filter housing 1, rotatably mounted at the bearing point 7 and is sealed there by a shaft ring 67. The hollow shaft end part 63 is connected to the end of the adjacent hollow shaft 55 by a tongue and groove connection 69 (FIG. 2). A drive shaft part 71 is connected to the top end of the hollow shaft 55 of the top washer arm 57, which drive shaft part is rotatably engaged with the hollow shaft 55 via a tongue and groove connection 69 (FIG. 2) as well. If the assembly 25 is installed in the filter housing 1, the drive shaft part 71 is rotatably mounted in the bearing point 17 of the housing cover 15. A shaft ring 73 is also provided for sealing purposes. A cover part 75 is provided as each of the top and bottom end of the stacked structure of the filter inserts 27, which cover parts 75 are identical parts and injection molded from plastic. After the insertion of the backwash device in conjunction with the hollow shaft end part 63 and drive shaft part 71, the cover parts are glued to the respective facing annular bodies 29, 31. The cover parts 75 have spoke-shaped supports 77, extending from an inner hub 76 to an outer ring 78 located on the cover circumference, which leave fluid passages open between each other. One annular groove 79 for a sealing ring 80 is formed in every outer ring 78.

FIG. 1 shows the first exemplary embodiment having a backwash filter assembly 25 installed in the filter housing 1 where the stacked structure is formed of two filter inserts 27. To drive the backwasher arms 57, an electrically or hydraulically actuated drive motor 82 is connected to the drive shaft part 71 via a coupling part 81 located thereon. In the exemplary embodiment of FIG. 1, in addition to the backwash filter assembly 25 having the stacked structure formed from the two filter inserts 27, a stacked structure formed having an additional filter insert 83 is provided. This filter insert 83 contains a bypass device 84. The housing of this filter insert 83 has a bottom annular disk 85 and a top annular disk 86 on its two face sides, of which the bottom annular disk 85 is mounted on the top annular body 29 of the adjacent filter insert 27 using the same tongue and groove connection as is provided between the filter inserts 27 to form the stacked structure to which the filter insert 83 has been added. In contrast to the image in FIG. 2, the cover part 75 is mounted on the top annular disk 86 of the bypass filter insert 83. On the radially inner ends of the annular disks 85, 86, which are radially spaced from the drive shaft part 71, there are projections 87 projecting axially towards each other. The projections 87 form the valve seat for the closing bodies 88 of a ring of bypass valves, which are pre-stressed in the closed position by springs 89. A filter material 91 forming the external circumference of the bypass filter insert 83 and extending between the bottom and the top annular disk 85, 86 forms a protective strainer when the bypass device 84 is activated.

Figure 5:
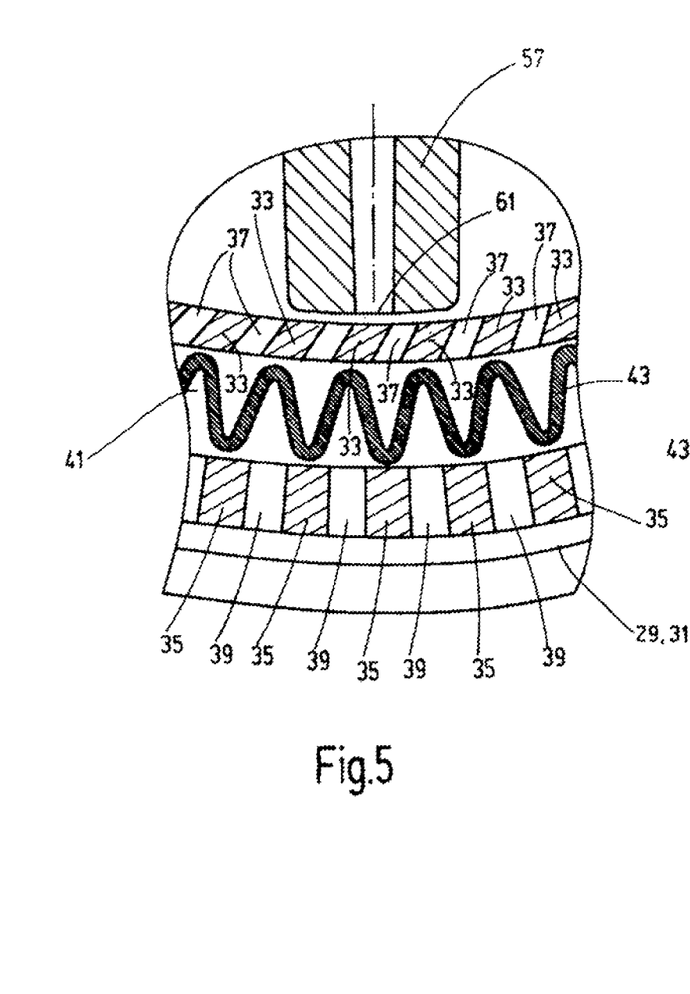
FIG. 5 is an enlarged partial top plan view in section of the area of a filter insert adjacent to the slot nozzle of a washer arm of the filter device of FIG. 1, wherein the slot nozzle is shown in a position aligned with an inner longitudinal frame part of the filter insert.
Figure 6:
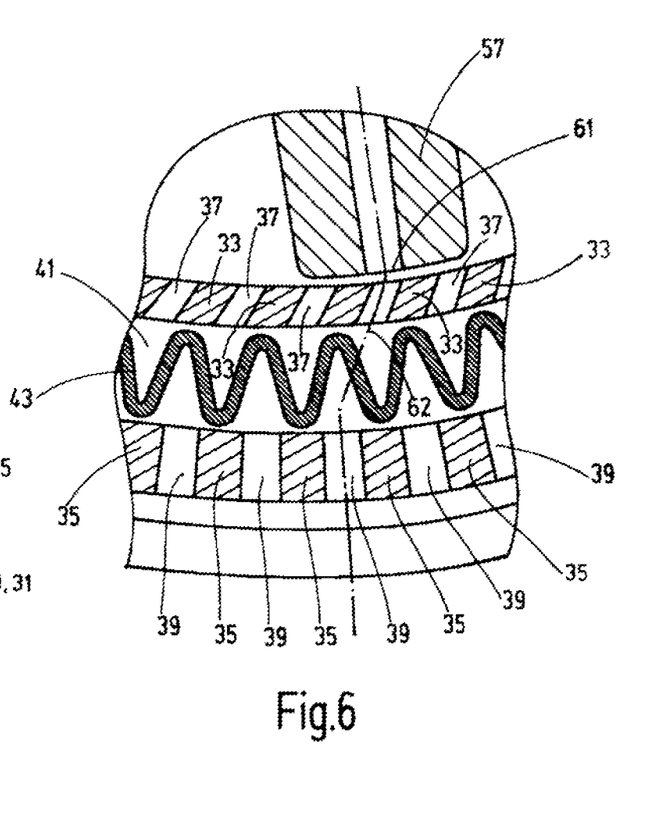
FIG. 6 is an enlarged a partial top plan view in section of the filter device of FIG. 1, wherein the slot nozzle is oriented at a fluid passage point between interior longitudinal frame parts.

During operation, the unfiltered fluid supplied via the inlet 11 flows through the passages between the supports 77 of the bottom cover part 75 into the interior of the filter inserts 27 and flows through the filter medium 43 during the filtering operation to the filtered fluid chamber 21 and is discharged through the outlet 19. The seal between the dirty side, i.e., the unfiltered fluid chamber 9 on the base 5, the interior of the filter inserts 27 and the central chamber 90 of the bypass filter insert 83 connected thereto, and the clean side, i.e., the chamber 21, is formed by the sealing rings 80 at the bottom cover part 75 and at the top cover part 75. Backwashing is performed with a backwash outlet 65 opened by a valve device (not shown). The slot nozzles 61 of the backwasher arm 57 move at small intervals along the inner frame parts 33 of the filter inserts 27, FIGS. 5 and 6, in which FIG. 5 shows one washer arm 57 and FIG. 6 shows the other of the two washer arms 57 in a position taken at the same time. As can be seen from these figures, the opening of the one slot nozzle 61 is aligned with an inner frame part 33, when the slot nozzle 61 of the other washer arm 57 is aligned with an inner fluid passage point 37. In this arrangement the backwash operation runs essentially continuously, i.e. without significant pulsation of the backwash flow. At the same time, the volume of the backwash flow is limited because at any point of time, the full passage cross section of only one fluid passage point 37 is available. As FIGS. 5 and 6 further show, the inner frame parts 37 have an oblique position relative to the radial direction, resulting in the flow direction of the flow through the passage points 37 being angled relative to the flow direction at the opening of the slot nozzle 61. This angling results in a flow direction in the chamber 41 during the backflow, as indicated in FIG. 6 by the dot-dashed line 62, in which the broad sides of the folds of the filter medium 43 are flowed through to facilitate the cleaning during the backwashing. The volume of the backwash flow is generated by the operating pressure of the system, for example an oil pressure in the range from 8 to 10 bar in a lubricating oil system. The backwash operation can additionally be supported by the generation of a vacuum at the backwash outlet 65. The fluid path inside the backwasher arms 57 expands relative to the opening cross section at the slot nozzle 61, which results in a type of Venturi effect and the flow rate in the immediate vicinity of the slot nozzle 61 being increased, facilitating the removal of contamination. If the filter medium 43 of the filter inserts 27 is blocked and the bypass device is activated, fluid reaches the filtered fluid chamber 21 and then the outlet 19 through a filter material 91 forming a circumferential cylinder jacket between the bottom annular disk 85 and the top annular disk 86 and serving as a protective strainer.

Figure 7:
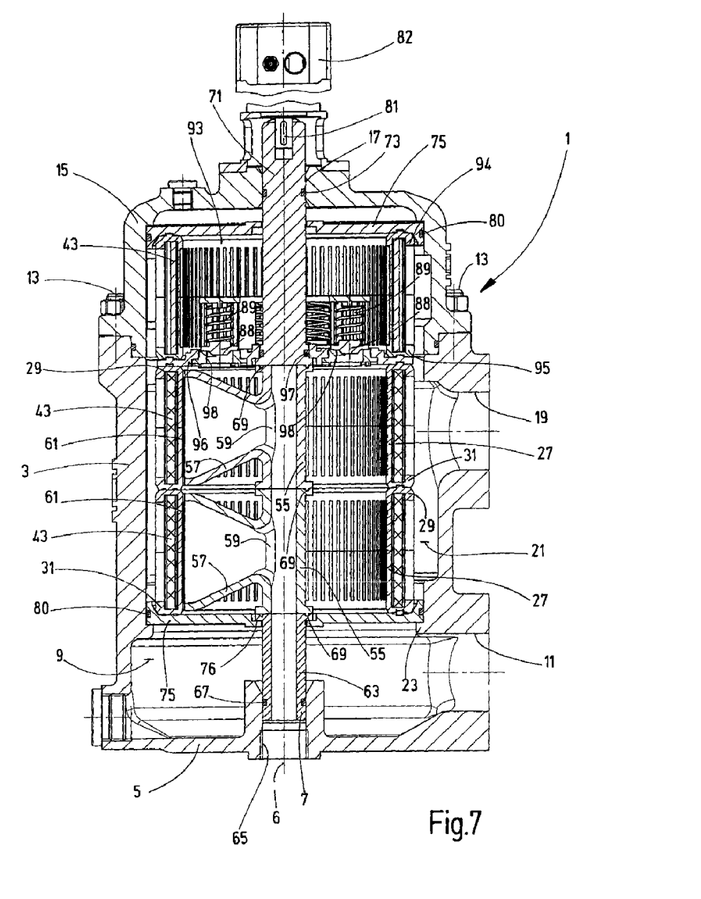
FIG. 7 is a side view in section of a filter device according to a second exemplary embodiment of the invention.

The second exemplary embodiment of FIG. 7 differs from the first exemplary embodiment only by a different design of an additional bypass filter insert 93. In a manner similar to that of the filter inserts 27, the bypass filter insert 93 has a housing having a top, annular body 94 on the face side, on which the cover part 75 is mounted. The filter medium 43 is arranged in a hollow cylindrical form between the inner and outer frame parts, as for the filter inserts 27. The filter fineness for this filter medium 43, which serves as a protective filter, is not as fine as for the filter inserts 27 and is up to 100 μm. A perforated disk 96 is attached to the bottom annular body 95 of the bypass filter insert 93 to form the stacked structure with the annular body 29 of the filter insert 27 below. The perforated disk is sealed by a sealing ring 97 on the drive shaft part 71 and has passages 98, on which valve seats are formed for the closing bodies 88 of a ring of bypass valves arranged vertically. If the filter medium 43 of the filter inserts 27 is blocked and the closing bodies 88 are opened, unfiltered fluid reaches the interior of the bypass filter insert 93 by the passages 98, exits via the filter medium 43 of the protective filter and reaches the outlet 19 via the chamber 21. The filter medium 43 of the filter inserts 27 can also have a coalescing layer in addition to the filter layer located between the outer support layers.

While various embodiments have been chosen to illustrate the invention, it will be understood by those skilled in the art that various changes and modifications can be made therein without departing from the scope of the invention as defined in the claims.

The invention claimed is:

1. A filter device, comprising:
    first and second filter inserts stacked axially along a longitudinal axis forming a stacked structure and having identical first and second insert housings, respectively, each of the first and second insert housings having first and second annular bodies on opposite axial sides thereof connected to each other by inner and outer frame parts extending parallel to the longitudinal axis, the inner and outer frame parts delimit fluid passage points between each of the inner frame parts and between each of the outer frame parts;
    a filter medium located in a space extending radially relative to the longitudinal axis between the inner and outer frame parts and extending axially along the longitudinal axis between the first and second annular bodies of each of the first and second filter inserts; and
    a backwasher displaceably arranged along insides of the first and second filter inserts.

2. A filter device according to claim 1 wherein
    the second annular body of the first insert housing has a projecting annular rib on an outside surface thereof facing the second insert housing; and
    the second annular body of the second insert housing has an annular recess on an outside surface thereof facing the first insert housing, the annular recess conforming to and receiving the projecting annular rib.

3. A filter device according to claim 2 wherein
    the projecting annular rib is subdivided into arcuate rib parts by an interrupting gap in the projecting annular rib; and
    the annular recess has an interrupting projection conforming to and received in the gap.

4. A filter device according to claim 2 wherein
    the first annular body of the first insert housing and the second annular body of the second insert housing have outside surfaces facing way from one another and having identical cover parts thereon.

5. A filter device according to claim 4 wherein
    at least one of the cover parts is fluid permeable.

6. A filter device according to claim 1 wherein
    the backwasher comprises motor drivable, first and second backwasher arms for the first and second inserts, respectively, each of the first and second backwasher arms having first and second slot nozzles traveling along the fluid passage points of the inner frame parts of the first and second insert housings, respectively, the first and second backwasher arms being coupled to and driven by a hollow drive shaft capable of removing backwash volumes from the filter device.

7. A filter device according to claim 6 wherein
    the first and second slot nozzles are axially offset along the longitudinal axis and rotationally offset by an angle such that one of the first and second slot nozzles open on one of the fluid passage points while the other of the first and second slot nozzles open simultaneously on one of the inner frame parts.

8. A filter device according to claim 7 wherein
    the one of the fluid passage points and the one of the inner frame parts are laterally adjacent.

9. A filter device according to claim 6 wherein
    the inner frame parts are slanted relative to a radial direction to the longitudinal axis defining a flow direction in each of the passage points delimited by the inner frame parts that is slanted by a specific angle relative to an inflow direction of the relevant slot nozzle.

10. A filter device according to claim 6 wherein
    the first and second slot nozzles extend from inner sides of the first and second filter inserts, respectively, to the hollow drive shaft.

11. A filter device according to claim 6 wherein
    each of the first and second backwasher arms is formed of identical components connected by tongue and groove connections at face sides thereof.

12. A filter device according to claim 1 wherein
    a spring-loaded bypass valve is arranged as an additional filter insert coupled to the first filter insert.

13. A filter device according to claim 1 wherein
    the first filter insert is glued to the second filter insert on facing surfaces thereof.

14. A filter device according to claim 1 wherein
    the stacked structure of the first and second filter inserts are removably located in a filter device housing, the filter device housing having a fluid inlet for unfiltered fluid, a fluid outlet for filtered fluid and a backwash outlet for backwash fluid.

15. A filter device according to claim 1 wherein
    the filter medium is in each of the first and second insert housings is covered on axial ends thereof by the respective annular bodies and on lateral sides thereof by the respective inner and outer frame parts.

* * * * *